US012646998B2

(12) United States Patent
Yu et al.

(10) Patent No.: US 12,646,998 B2
(45) Date of Patent: Jun. 2, 2026

(54) DISCHARGED LIQUID CIRCULATION SYSTEM, AN ELECTRIC DRIVE POWER ASSEMBLY AND AN AUTOMOBILE

(71) Applicant: Jing-Jin Electric Technologies Co., Ltd., Beijing (CN)

(72) Inventors: Ping Yu, Beijing (CN); Jianwen Li, Beijing (CN); Huaijin Liu, Beijing (CN); Zhengdong Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 218 days.

(21) Appl. No.: 18/776,942

(22) Filed: Jul. 18, 2024

(65) Prior Publication Data

US 2025/0357824 A1  Nov. 20, 2025

(30) Foreign Application Priority Data

May 17, 2024  (CN) .......................... 202410619882.3

(51) Int. Cl.
*H02K 9/193* (2006.01)
*B60K 11/02* (2006.01)
(52) U.S. Cl.
CPC .............. *H02K 9/193* (2013.01); *B60K 11/02* (2013.01)
(58) Field of Classification Search
CPC ............ C09K 11/06; C09K 2211/1029; H10K 2101/10; H10K 50/00; H10K 50/10;
(Continued)

(56) References Cited

U.S. PATENT DOCUMENTS 11,588,379 B2* 2/2023 Steinz ................. F16H 57/0415
2014/0172250 A1 6/2014 Tamai et al.
(Continued)

FOREIGN PATENT DOCUMENTS

CN     114893556 A    8/2022
EP        4063695 A1    9/2022
WO   2023/006216 A1    2/2023

OTHER PUBLICATIONS

European Search Report received for Patent Application No. 24189082.
1, mailed on Feb. 14, 2025, 5 pages.

*Primary Examiner* — Naishadh N Desai
(74) *Attorney, Agent, or Firm* — ARENTFOX SCHIFF LLP

(57) ABSTRACT

A discharged liquid circulation system, an electric drive power assembly and an automobile are disclosed. The discharged liquid circulation system includes a first liquid collecting tank and a second liquid collecting tank, the first liquid collecting tank and the second liquid collecting tank being in communication communicated with each other, and a first liquid level sensor and a second liquid level sensor are provided in the second liquid collecting tank; an electromagnetic reversing valve that includes a first liquid inlet and a second liquid inlet that extend into the first liquid collecting tank and the second liquid collecting tank through two pipes, respectively; and an electric pump, wherein a liquid inlet of the electric pump is connected to a liquid outlet of the electromagnetic reversing valve through a first pipe, and a liquid outlet of the electric pump is connected to a corresponding liquid spray nozzle through a second pipe.

17 Claims, 2 Drawing Sheets

(58) Field of Classification Search
CPC ........ H10K 50/11; H10K 50/15; H10K 50/16;
H10K 50/805; H10K 85/20; H10K
85/342; H10K 85/615; H10K 85/631;
H10K 85/654; H10K 85/6572; H10K
85/6574; H10K 99/00; B60K 11/02;
B60K 2001/003; B60K 2001/006; B60Y
2306/03; B60Y 2306/05; B60Y
2400/3019; B60Y 2400/4045; F16H
57/0412; F16H 57/0435; F16H 57/0449;
F16H 57/0456; F16H 57/0476; H02K
9/193
See application file for complete search history.

(56)                 References Cited

U.S. PATENT DOCUMENTS

2016/0178548 A1 *  6/2016  Berry ..................... F28D 15/00
                                                      374/138
2018/0241288 A1 *  8/2018  Murakami ............. H02K 5/132
2019/0093755 A1    3/2019  Kiyokami et al.

* cited by examiner

DISCHARGED LIQUID CIRCULATION SYSTEM, AN ELECTRIC DRIVE POWER ASSEMBLY AND AN AUTOMOBILE

CROSS REFERENCING OF RELATED APPLICATIONS

This application claims priority to Chinese Patent Application No. 202410619882.3 filed with the Chinese Patent Office on May 17, 2024 and entitled "A DISCHARGED LIQUID CIRCULATION SYSTEM, AN ELECTRIC DRIVE POWER ASSEMBLY AND AN AUTOMOBILE", the content of which is hereby incorporated by reference in its entirety.

TECHNICAL FIELD

The present disclosure relates to the technical field of automobile power, and in particular to a discharged liquid circulation system, an electric drive power assembly and an automobile.

BACKGROUND

In the fields such as automobile power, the motor in the electric drive system is cooled and lubricated by oil spray. When the horizontal positions of the motor and the transmission are inconsistent, two separate oil supply systems are needed for the motor and the transmission respectively, but two separate oil supply systems take up a lot of space and increase the weight and costs. Thus, there is an urgent need for a discharged liquid circulation system to solve the above problems.

It should be noted that the description above only provides background information related to the present disclosure and does not necessarily constitute prior art.

SUMMARY

With respect to the above problems, the present disclosure provides a discharged liquid circulation system, an electric drive power assembly, and an automobile to overcome the above problems or at least partially solve the above problems.

The present disclosure adopts the following technical solutions.

A first aspect of the present disclosure provides a discharged liquid circulation system, comprising a first liquid collecting tank and a second liquid collecting tank, wherein the first liquid collecting tank and the second liquid collecting tank are communicated with each other, and a first liquid level sensor and a second liquid level sensor are provided in the second liquid collecting tank to obtain a liquid level of the second liquid collecting tank respectively; an electromagnetic reversing valve, wherein the electromagnetic reversing valve comprises a first liquid inlet and a second liquid inlet that extend into the first liquid collecting tank and the second liquid collecting tank through two pipes respectively; and an electric pump, wherein a liquid inlet of the electric pump is connected to a liquid outlet of the electromagnetic reversing valve through a first pipe, and a liquid outlet of the electric pump is connected to a corresponding liquid spray nozzle through a second pipe.

Preferably, a reflux channel is provided between the first liquid collecting tank and the second liquid collecting tank, a coolant liquid level in the first liquid collecting tank is flush with the reflux channel, and a coolant liquid level in the second liquid collecting tank is lower than the reflux channel; or, the coolant liquid level in the second liquid collecting tank is flush with the reflux channel, and the coolant liquid level in the first liquid collecting tank is lower than the reflux channel.

Preferably, the first liquid collecting tank and the second liquid collecting tank share a common side wall, and the reflux channel is provided in the common side wall; or, internal spaces of the first liquid collecting tank and the second liquid collecting tank are communicated, and a tank wall that is flush with the coolant liquid level of the first liquid collecting tank is provided between the internal spaces.

Preferably, the first liquid level sensor is provided on a front side surface of the second liquid collecting tank, and the second liquid level sensor is provided on a rear side surface of the second liquid collecting tank.

Preferably, the discharged liquid circulation system further comprises a heat exchanger, a liquid inlet of the heat exchanger is connected to a liquid outlet of the electric pump through a third pipe, and a liquid outlet of the heat exchanger is connected to a corresponding liquid spray nozzle through a fourth pipe.

Preferably, the electric pump and the electromagnetic reversing valve are integrally formed, and a coolant channel is provided inside the electric pump and the electromagnetic reversing valve.

Preferably, the discharged liquid circulation system further comprises a controller, and the controller is respectively connected to the first liquid level sensor, the second liquid level sensor, the electromagnetic reversing valve and the electric pump.

A second aspect of the present disclosure further provides an electric drive power assembly, comprising any one of the discharged liquid circulation systems as described in the first aspect.

A third aspect of the present disclosure further provides an automobile comprising the electric drive power assembly as described in the second aspect.

The following beneficial effects can be achieved by at least one of the above technical solutions adopted in the present disclosure.

The discharged liquid circulation system in the present disclosure can automatically monitor the coolant liquid levels in the liquid collecting tanks and automatically switch the tank from which the liquid is sucked, so that the coolant is automatically discharged and supplemented while the liquid levels of the liquid collecting tanks are monitored, thereby meeting the needs of liquid level control in the liquid collecting tanks. In addition, the discharged liquid circulation system has a compact structure, light weight and low cost, and is suitable for oil-cooled motor low-position arrangement systems, which provide more choices for the arrangement of oil-cooled motor.

The above is only an overview of the technical solutions of the present disclosure. In order to better understand the technical means of the present disclosure so that it can be implemented according to the contents of the description, and in order to make the above and other objects, features and advantages of the present disclosure more obvious and easier to understand, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
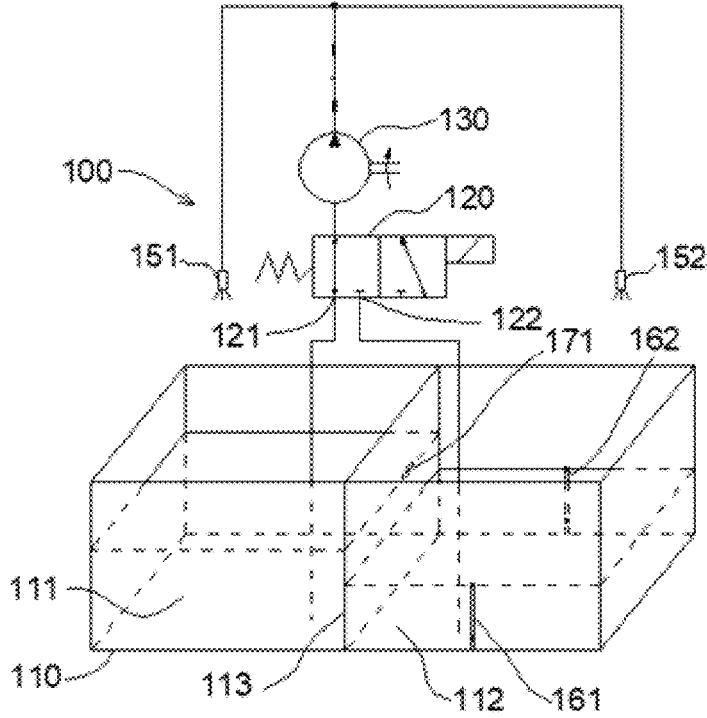
FIG. 1 is a first schematic diagram of a discharged liquid circulation system in an embodiment of the present disclosure.

In the drawings: 100, discharged liquid circulation system; 110, liquid collecting tank; 111, first liquid collecting tank; 112, second liquid collecting tank; 113, tank wall; 120, electromagnetic reversing valve; 121, first liquid inlet; 122, second liquid inlet; 130, electric pump; 140, heat exchanger; 151, first liquid spray nozzle; 152, second liquid spray nozzle; 161, first liquid level sensor; 162, second liquid level sensor; 171, reflux channel.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

The inventive concept of the present disclosure is, with respect to the situation in the prior art that two separate oil supply systems are needed for the motor and the transmission when the horizontal positions of the motor and the transmission are inconsistent, to design an automatic and universal discharged liquid circulation system, which triggers and controls the electromagnetic reversing valve to automatically switch the liquid suction channel through signals from the liquid level sensors, which realizes the switching of liquid suction from different liquid collecting tanks, and thus adjusts and controls the liquid levels of different liquid collecting tanks.

The technical solutions provided by the embodiments of the present disclosure will be described in detail below in conjunction with the accompanying drawings.

An embodiment of the present disclosure provides a discharged liquid circulation system, an electric drive power assembly and an automobile. As shown in FIG. 1 which is a first schematic diagram of a discharged liquid circulation system in an embodiment of the present disclosure, the discharged liquid circulation system 100 comprises: a first liquid collecting tank 111 and a second liquid collecting tank 112; an electromagnetic reversing valve 120; and an electric pump 130. The first liquid collecting tank 111 and the second liquid collecting tank 112 are communicated through a reflux channel 171. A first liquid level sensor 161 and a second liquid level sensor 162 are provided in the second liquid collecting tank 112, and are used to obtain the liquid level of the second liquid collecting tank respectively. A liquid inlet of the electromagnetic reversing valve 120 extends into the coolant in the first liquid collecting tank 111 and the second liquid collecting tank 112 respectively through two pipes. A liquid inlet of the electric pump 130 is connected to the liquid outlet of the electromagnetic reversing valve 120 through a pipe, and the liquid outlet of the electric pump 130 is connected to a corresponding liquid spray nozzle through a second pipe. The liquid spray nozzle comprises a first liquid spray nozzle and a second liquid spray nozzle, the first liquid spray nozzle is used for oil spray cooling of the transmission, and the second liquid spray nozzle is used for oil spray cooling of the motor. In the present disclosure, the pipes connecting the electromagnetic reversing valve, the electric pump and the liquid collecting tanks include oil pipes, hole channels, etc., so that the coolant flows along a preset path.

As shown in FIG. 1, in the present disclosure, the first liquid collecting tank 111 is set in the transmission to collect the coolant flowing in from the transmission side; the second liquid collecting tank 112 is applied to the motor to collect the coolant flowing in from the motor side.

After the discharged liquid circulation system is started, the system determines the liquid level of the second liquid collecting tank 112 through the first liquid level sensor 161 and the second liquid level sensor 162. The first liquid level sensor 161 and the second liquid level sensor 162 provide real-time feedback of liquid level information. When the first liquid level sensor 161 and the second liquid level sensor 162 both detect that the liquid level of the second liquid collecting tank 112 is at a low level, the controller (not shown) controls the electromagnetic reversing valve 120 so that the coolant enters the first liquid inlet 121 of the electromagnetic reversing valve 120 from the first liquid collecting tank 111. That is, at this point, the electric pump 130 sucks liquid from the first liquid collecting tank 111. After the coolant passes through the electric pump, the first liquid spray nozzle and the second liquid spray nozzle, the transmission and the motor are sprayed with oil for cooling respectively.

When only one of the first liquid level sensor 161 and the second liquid level sensor 162 has detected that the liquid level of the second liquid collecting tank 112 is at a low level, the controller (not shown) controls the electromagnetic reversing valve 120 so that the coolant enters the second liquid inlet 122 of the electromagnetic reversing valve 120 from the second liquid collecting tank 112. That is, at this point, the electric pump 130 sucks liquid from the second liquid collecting tank 112, thereby the liquid level of the second liquid collecting tank 112 is lowered to prevent the liquid in the second liquid collecting tank from flooding over the air gap position of the motor. After the coolant passes through the electric pump, the first liquid spray nozzle and the second liquid spray nozzle, the transmission and the motor are sprayed with oil for cooling respectively.

In the present disclosure, the reflux channel 171 is provided between the first liquid collecting tank 111 and the second liquid collecting tank 112. The coolant liquid level in the first liquid collecting tank is flush with the reflux channel 171, and the coolant liquid level in the second liquid collecting tank is lower than the reflux channel 171. Alternatively, the coolant liquid level in the second liquid collecting tank is flush with the reflux channel 171, and the coolant liquid level in the first liquid collecting tank is lower than the reflux channel 171.

Figure 2:
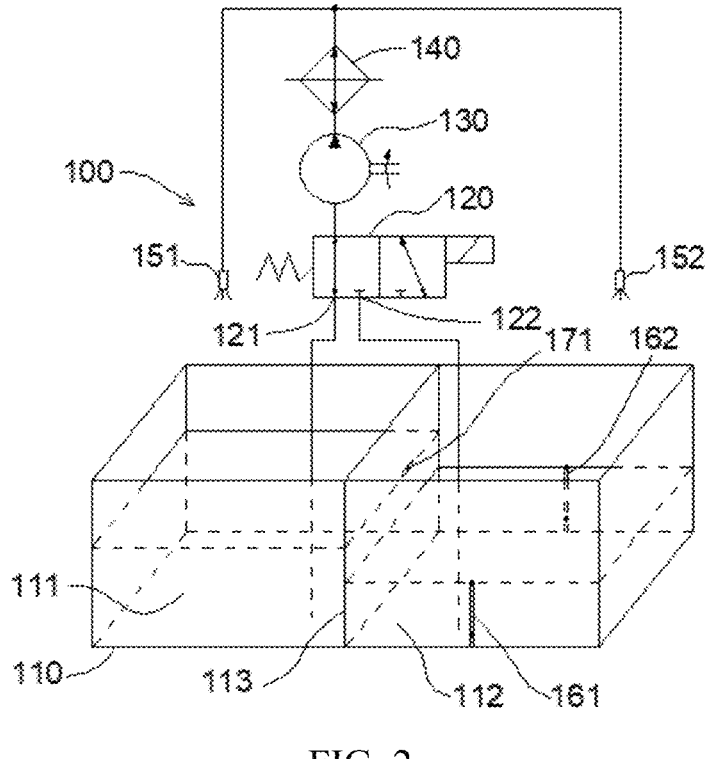
FIG. 2 is a second schematic diagram of a discharged liquid circulation system in an embodiment of the present disclosure.

As shown in FIGS. 1 and 2, the first liquid collecting tank 111 and the second liquid collecting tank 112 have coolants at different heights, the coolant height of the first liquid collecting tank 111 is the same as the height of the reflux channel 171, and the coolant height of the second liquid collecting tank 112 is less than the height of the reflux channel 171. In this way, it can be ensured that the coolants in the first liquid collecting tank 111 and the second liquid collecting tank 112 are at different heights, thereby solving the problem of the liquid flooding over the air gap position of the motor caused by using the liquid collecting tanks with the same liquid level when the motor and the transmission are set at different heights and angles.

It can be understood that the first liquid collecting tank 111 and the second liquid collecting tank 112 perform oil spray cooling on the transmission and the motor respectively. In specific implementation, the first liquid collecting tank 111 and the second liquid collecting tank 112 are set at different positions according to the different positions of the transmission and the motor. In the present disclosure, the heights of coolant liquid levels in the first liquid collecting tank and the second liquid collecting tank correspond to the heights of positions of the transmission and the motor.

In some examples of the present disclosure, the first liquid collecting tank 111 and the second liquid collecting tank 112 share a common side wall, and the reflux channel is provided in the common side wall; or, the internal spaces of the first liquid collecting tank 111 and the second liquid collecting tank 112 are communicated, and a tank wall 113 that is flush with the coolant liquid level of the first liquid collecting tank is provided between the internal spaces.

As shown in FIG. 2, in the present disclosure, in specific implementation, the communication between the first liquid collecting tank 111 and the second liquid collecting tank 112 can be achieved in two ways. In the first way, the first liquid collecting tank 111 and the second liquid collecting tank 112 share a common side wall (tank wall 113), and the common side wall closes both the first liquid collecting tank 111 and the second liquid collecting tank 112, and the reflux channel 171 is provided in the common side wall. At this point, the liquid collecting tank 110 is separated by the tank wall 113 into two liquid collecting tanks (the first liquid collecting tank 111 and the second liquid collecting tank 112) that can store liquids at different heights. The reflux channel 171 is provided in the tank wall 113. The reflux channel is flush with the liquid level of coolant pre-stored in the first liquid collecting tank 111. The liquid level of coolant pre-stored in the second liquid collecting tank 112 is lower than that in the first liquid collecting tank.

In the second way, the first liquid collecting tank 111 and the second liquid collecting tank 112 also share a common side wall (tank wall 113). At this point, the tank wall 113 is the lower half of the entire side wall, and the tank wall does not close the first liquid collecting tank 111 and the second liquid collecting tank 112. That is, the internal spaces of the first liquid collecting tank 111 and the second liquid collecting tank 112 are communicated, and the tank wall 113 that is level with the coolant liquid level of the first liquid collecting tank is provided between the internal spaces. In this scenario, the reflux channel may not be provided, and the coolant can overflow from the tank wall 113. At this point, the collecting tank 110 is separated by the tank wall 113 into two liquid collecting tanks (the first collecting tank 111 and the second collecting tank 112) that can store liquid at different level heights. The tank wall is flush with the liquid level of coolant pre-stored in the first collecting tank 111, and the liquid level of coolant pre-stored in the second collecting tank 112 is lower than the liquid level of coolant pre-stored in the first collecting tank 111.

In some examples of the present disclosure, the discharged liquid circulation system further comprises a heat exchanger 140, the inlet of the heat exchanger 140 is connected to the outlet of the electric pump 130 through a third pipe, and the outlet of the heat exchanger 140 is connected to a corresponding spray nozzle through a fourth pipe.

As shown in FIG. 2, in specific implementation, the first liquid inlet 121 of the electromagnetic reversing valve 120 is communicated with the first liquid collecting tank 111, the second liquid inlet 122 of the electromagnetic reversing valve 120 is communicated with the second liquid collecting tank 112, and the liquid outlet of the electromagnetic reversing valve 120 is communicated with the liquid inlet of the electric pump 130; the liquid outlet of the electric pump 130 is communicated with the liquid inlet of the heat exchanger 140 through a pipeline, and the liquid outlet of the heat exchanger 140 is communicated with the first liquid spray nozzle 151 and the second liquid spray nozzle 152 through a pipeline, respectively, to distribute the liquid to the position where cooling is needed. The coolant sprayed flows back to the first liquid collecting tank 111 or the second liquid collecting tank 112 under the action of gravity.

In some examples of the present disclosure, the first liquid level sensor 161 is provided on the front side surface of the second liquid collecting tank 112, and the second liquid level sensor 162 is provided on the rear side surface of the second liquid collecting tank 112.

In specific implementation, as shown in FIG. 2, the first liquid level sensor 161 and the second liquid level sensor 162 are provided in a middle position of the front and rear side surfaces of the second liquid collecting tank 112 where the liquid level needs to be controlled, and the liquid level of the second liquid collecting tank 112 is monitored in real time to prevent the liquid from flooding over the air gap position of the motor due to the liquid level in the second liquid collecting tank 112 exceeding a warning level during the oil spray cooling process.

In some examples of the present disclosure, the discharged liquid circulation system 100 further comprises a controller (not shown), which is connected to the first liquid level sensor 161, the second liquid level sensor 162, the electromagnetic reversing valve 120 and the electric pump 130 respectively, and is used to trigger different working states of the electromagnetic reversing valve 120 and the electric pump 130 through the feedback signals from the liquid level sensors.

In the present disclosure, the control cables of the electromagnetic reversing valve 120, the electric pump 130, the first liquid level sensor 161, and the second liquid level sensor 162 are connected to the controller, and the oil spray cooling is automatically performed according to a preset program.

In specific use, since this discharged liquid circulation system is applied to automobiles, and different road conditions may be encountered when an automobile is moving, the liquid collecting tank 110 (the first liquid collecting tank 111 and the second liquid collecting tank 112) in the present disclosure may tilt to different directions.

When the liquid collecting tank 110 tilts to the right, due to the action of gravity, the coolant will flow freely in the first liquid collecting tank 111 and the second liquid collecting tank 112. At this point, the liquid level in the second liquid collecting tank 112 will change. In order to prevent the liquid surface in the second liquid collecting tank 112 from rising and flooding over the air gap position of the motor, when only one of the first liquid level sensor 161 and the second liquid level sensor 162 (through low liquid level detection points of the two liquid level sensors) arranged in the second liquid collecting tank 112 has detected that the liquid level in the second liquid collecting tank 112 is lower than the preset liquid level, the controller controls the electromagnetic reversing valve to operate, so that the liquid inlet of the electric pump is communicated with the second liquid collecting tank 112, and the coolant is sucked from the second liquid collecting tank 112. Then, it is sprayed out from the first liquid spray nozzle 151 and the second liquid spray nozzle 152 through the pipeline. The coolant that flows back to the first liquid collecting tank 111 automatically flows back to the second liquid collecting tank 112 through the reflux channel 171, and a balance of discharge and inflow is formed in the second liquid collecting tank 112.

Based on the same principle, when the liquid collecting tank 110 tilts forward and backward, due to the gravity, the coolant will flow freely in the first liquid collecting tank 111 and the second liquid collecting tank 112. At this point, the liquid level in the second liquid collecting tank 112 will change, and the liquid levels detected by the first liquid level sensor 161 and the second liquid level sensor 162 will be different. As long as only one of the first liquid level sensor 161 and the second liquid level sensor 162 has detected that the liquid level in the second liquid collecting tank 112 is lower than the preset liquid level (through low liquid level detection points of the two liquid level sensors), the controller controls the electromagnetic reversing valve to operate, so that the liquid inlet of the electric pump 130 is communicated with the second liquid collecting tank 112, and the coolant is sucked from the second liquid collecting tank 112.

When the liquid collecting tank 110 tilts to the left, due to the gravity, the coolant will flow freely in the first liquid collecting tank 111 and the second liquid collecting tank 112. At this point, the liquid level in the second liquid collecting tank 112 will change. If it tilts to the left seriously, the liquid levels in the second liquid collecting tank 112 detected by the first liquid level sensor 161 and the second liquid level sensor 162 will be lower than the preset liquid level (through low liquid level detection points of the two liquid level sensors) at the same time. At this point, the controller controls the electromagnetic reversing valve 120 to operate, so that the liquid inlet of the electric pump is communicated with the first liquid collecting tank 111, and the coolant is sucked from the first liquid collecting tank 111 and sprayed out through the liquid spray nozzles. The coolant that flows back to the second liquid collecting tank 112 automatically flows back to the first liquid collecting tank 111 through the reflux channel 171, thereby ensuring that the liquid level in the second liquid collecting tank 112 does not exceed high liquid level detection points of the liquid level sensors, and thus ensuring the normal operation of the motor. It can be understood that the controller in the present disclosure controls the operation of the electromagnetic reversing valve through signals from the liquid level sensors, automatically switches the channel, realizes the switching of tank from which the liquid is sucked by the electric pump, and thus adjusts and controls the liquid levels of liquid collecting tanks.

In some examples of the present disclosure, the electric pump and the electromagnetic reversing valve are integrally formed, and a coolant channel is provided inside the electric pump and the electromagnetic reversing valve.

In the present disclosure, the electric pump and the electromagnetic reversing valve may, as separate components, be installed at the installation positions on the wall of the liquid collecting tank; alternatively, the electric pump and the electromagnetic reversing valve may also be integrated together and then installed at the installation position on the wall of the liquid collecting tank, so that the discharged liquid system has the advantages of simple structure, small space occupation, and high integration.

It can be understood that the orientation in the present disclosure is described based on the orientation shown in FIGS. 1 and 2. In specific implementation, the discharged liquid circulation system is installed at a preset position on an automobile, and different installation positions may cause the described orientation to change, so it should not be excluded from the protection scope of the technical solution of the present disclosure.

An embodiment of the present disclosure further provides an electric drive power assembly comprising the discharged liquid circulation system as described above. For other parts of the electric drive power assembly, please refer to the prior art, and the present disclosure will not repeat them.

It can be understood that the electric drive power assembly in the present disclosure can automatically monitor the coolant liquid levels and automatically switch the tank from which the liquid is sucked, so that the liquid level of the second liquid collecting tank that needs liquid level control are monitored and the coolant is automatically discharged and supplemented, thereby meeting the needs of liquid level control in the liquid collecting tank. In addition, the specific structure of the discharged liquid circulation system in the present disclosure makes it compact, light and low-cost, and suitable for oil-cooled motor low-position arrangement systems, which provide more choices for the arrangement of oil-cooled motor.

An embodiment of the present disclosure further provides an automobile comprising the electric drive power assembly as described above. For other parts of the automobile, please refer to the prior art, and the present disclosure will not repeat them.

It should be noted that in the description of the present disclosure, the terms "first", "second", etc. are only used for descriptive purposes and should not be understood as indicating or implying relative importance. Furthermore, in the description of the present disclosure, unless otherwise specified, "multiple" or "a plurality of" means two or more.

In the present disclosure, unless otherwise specified and defined, the terms such as "installation", "connection", "fixation" should be understood in a broad sense, for example, it may be fixedly connected, or detachably connected, or integrally connected; it may also be mechanically connected, electrically connected, or communicated with each other; it may be directly connected or indirectly connected through a middleware; it may also be internally communicated or interacted between two components. For a person of ordinary skill in the art, the specific meaning of these terms in the present disclosure should be understood according to specific situations.

In the present disclosure, unless otherwise specified and defined, a first feature being located "on" or "beneath" a second feature may be that the first and second features are in direct contact or in indirect contact through an intermediate medium. Moreover, a first feature being "over" or "above" a second feature may be that the first feature is directly or diagonally above the second feature, or only indicate that the first feature is horizontally higher than the second feature. The first feature being "below" or "under" the second feature may be that the first feature is directly or diagonally below the second feature, or only indicate that the horizontal height of the first feature is less than that of the second feature.

The description of any process or method in a flowchart or otherwise described herein may be understood as comprising one or more modules, fragments, or portions of codes of executable instructions for implementing specific logical functions or procedures, and the scope of preferred embodiments of the present disclosure comprises other implementations, which may not be in the order shown or discussed, including performing functions in a fundamentally simultaneous manner or in reverse order based on the functions involved. This should be understood by those skilled in the art.

In the description of this specification, terms such as "an embodiment", "some embodiments", "an example", "a specific example", or "some examples" means that the specific features, structures, materials, or features described in conjunction with the embodiments or examples are included in at least one embodiment or example of the present disclosure. In this specification, the illustrative description of the above terms may not necessarily refer to the same embodiments or examples. Moreover, the specific features, structures, materials, or characteristics described can be combined in an appropriate manner in any one or more embodiments or examples.

Although embodiments of the present disclosure have been shown and described above, it can be understood that the above embodiments are exemplary and cannot be understood as a limitation of the present disclosure. A person of ordinary skill in the art may make changes, modifications, substitutions, and variations to the above embodiments within the scope of the present disclosure.

What is claimed:

1. A discharged liquid circulation system, comprising:
a first liquid collecting tank and a second liquid collecting tank, wherein the first liquid collecting tank and the second liquid collecting tank are configured to communicate with each other, and a first liquid level sensor and a second liquid level sensor are provided in the second liquid collecting tank to obtain a liquid level of the second liquid collecting tank, respectively;
an electromagnetic reversing valve comprising a first liquid inlet and a second liquid inlet that extend into the first liquid collecting tank and the second liquid collecting tank, respectively; and
an electric pump, wherein a liquid inlet of the electric pump is connected to a liquid outlet of the electromagnetic reversing valve through a first pipe, and a liquid outlet of the electric pump is connected to a corresponding liquid spray nozzle through a second pipe.

2. The discharged liquid circulation system according to claim 1, wherein:
a reflux channel is provided between the first liquid collecting tank and the second liquid collecting tank, a coolant liquid level in the first liquid collecting tank is flush with the reflux channel, and a coolant liquid level in the second liquid collecting tank is lower than the reflux channel; or the coolant liquid level in the second liquid collecting tank is flush with the reflux channel, and the coolant liquid level in the first liquid collecting tank is lower than the reflux channel.

3. The discharged liquid circulation system according to claim 2, wherein the first liquid collecting tank and the second liquid collecting tank share a common side wall, and the reflux channel is provided in the common side wall.

4. The discharged liquid circulation system according to claim 1, wherein internal spaces of the first liquid collecting tank and the second liquid collecting tank are communicated, and a tank wall that is flush with the coolant liquid level of the first liquid collecting tank is provided between the internal spaces.

5. The discharged liquid circulation system according to claim 2, wherein the first liquid level sensor is provided on a front side surface of the second liquid collecting tank, and the second liquid level sensor is provided on a rear side surface of the second liquid collecting tank.

6. The discharged liquid circulation system according to claim 2, further comprising a heat exchanger, a liquid inlet of the heat exchanger is connected to the liquid outlet of the electric pump through a third pipe, and a liquid outlet of the heat exchanger is connected to a corresponding liquid spray nozzle through a fourth pipe.

7. The discharged liquid circulation system according to claim 2, wherein the electric pump and the electromagnetic reversing valve are integrally formed, and a coolant channel is provided inside the electric pump and the electromagnetic reversing valve.

8. The discharged liquid circulation system according to claim 2, further comprising a controller that is respectively connected to the first liquid level sensor, the second liquid level sensor, the electromagnetic reversing valve and the electric pump.

9. An electric drive power assembly, comprising the discharged liquid circulation system according to claim 1.

10. An automobile comprising the electric drive power assembly according to claim 9.

11. An electric drive power assembly, comprising the discharged liquid circulation system according to claim 2.

12. An electric drive power assembly, comprising the discharged liquid circulation system according to claim 3.

13. An electric drive power assembly, comprising the discharged liquid circulation system according to claim 4.

14. An electric drive power assembly, comprising the discharged liquid circulation system according to claim 5.

15. An electric drive power assembly, comprising the discharged liquid circulation system according to claim 6.

16. An electric drive power assembly, comprising the discharged liquid circulation system according to claim 7.

17. An electric drive power assembly, comprising the discharged liquid circulation system according to claim 8.

* * * * *